United States Patent
Akiyama-Warren

(10) Patent No.: US 6,546,850 B1
(45) Date of Patent: Apr. 15, 2003

(54) MEATLOAF PAN WITH REMOVABLE, HINGED, PAN INSERT

(76) Inventor: Yumi Akiyama-Warren, 5146 W. 138th St., Hawthorne, CA (US) 90250

( * ) Notice: Subject to any disclaimer, the term of this patent is extended or adjusted under 35 U.S.C. 154(b) by 652 days.

(21) Appl. No.: 09/045,511

(22) Filed: Mar. 20, 1998

(51) Int. Cl.$^7$ .............................. A23P 1/10; A47J 27/12
(52) U.S. Cl. ............................. 99/427; 99/446; 99/449; 99/450; 220/573.4; 220/755; 220/759; 220/770; 426/389; 426/394; 426/523
(58) Field of Search ................... 426/389, 394, 426/113, 523; 99/426, 444, 445, 450, 427, 449; 220/573.4, 759, 770, 754, 755

(56) References Cited

U.S. PATENT DOCUMENTS

| | | | |
|---|---|---|---|
| 266,974 A | * | 11/1882 | Cox |
| 476,137 A | * | 5/1892 | Eustis |
| 1,009,227 A | * | 11/1911 | Rozir |
| 1,272,222 A | * | 7/1918 | Clayton |
| 1,698,914 A | * | 1/1929 | Kircher |
| 4,106,486 A | * | 8/1978 | Lee ............................. 126/369 |
| 4,117,965 A | * | 10/1978 | Rienzo ..................... 224/48 R |
| 4,334,517 A | * | 6/1982 | Sweitzer ...................... 126/21 |
| 4,645,090 A | * | 2/1987 | Lewin ....................... 220/23.4 |
| 5,680,803 A | * | 10/1997 | Vizurraga et al. ............ 83/762 |

* cited by examiner

Primary Examiner—Keith Hendricks
Assistant Examiner—Drew Becker
(74) Attorney, Agent, or Firm—John D. Gugliotta

(57) ABSTRACT

A meatloaf pan with removable, hinged pan insert is disclosed, comprising an elongated, rectangular meatloaf pan and an elongated, rectangular pan insert. The pan insert has two insert side panels that are hinged at their bottom edges to the longitudinal edges of the bottom of the pan insert. The hinges allow the insert side walls to support the meatloaf, bread or other product during baking, and fold downward to allow access to the product for cutting and serving purposes. As such, the present invention can be used as a serving tray. Removal of the pan insert is facilitated in one of three ways. First, built-in hand grips in the flanges located on the pan insert. Second, a set of handles that connect to the flanges located on the pan insert. Third, a sliding unit that slidably inserts into the cavity formed by the rolled edges of the flanges on the pan insert.

10 Claims, 6 Drawing Sheets

MEATLOAF PAN WITH REMOVABLE, HINGED, PAN INSERT

BACKGROUND OF THE INVENTION

1. Field of the Invention

The present invention relates generally to food lifting devices and, more particularly, to a meatloaf pan with removable, hinged, pan insert.

2. Description of the Related Art

Baking products, such as meat and bread, is a common occurrence in the United States. Especially delicious is baked meatloaf.

The previous art is filled with loaf pans of varying configuration, such as the device disclosed in U.S. Design Pat. No. D289,844, issued in the name of Daenen et. al. However, there are several problems associated with the baking of meatloaf in conventional loaf pans. First, the loaves of meat have a tendency to stick to the sides of the pan, making removal of the intact meatloaf difficult if not impossible. Removal often necessitates skewering the tender meat with a fork or knife and then lifting it from the pan, thereby damaging its aesthetic appearance. Second, transferring the meatloaf from a pan to a plate often results in breakage of the meatloaf. The third problem relates to the accumulation of grease in the bottom of the pan that has drained from the meatloaf during baking. This grease causes a mess when the meatloaf is removed from the pan.

Devices in the prior art attempt to address these problems. U.S. Pat. No. 1,630,471, issued in the name of Collins, discloses a rack for roasters with side walls that fold inward for easy storage.

U.S. Pat. No. 1,718,624, issued in the name of Baker, discloses a wire rack with wire handles designed for baking and lifting fish from its cooking position in an oven.

U.S. Pat. No. 2,544,846, issued in the name of Mach, discloses a frying pan with a second bottom, positioned above the traditional bottom, with holes in it to drain grease away from the meat and into the traditional bottom of the frying pan.

U.S. Pat. No. 2,565,046, issued in the name of Rooth, discloses a roaster tray for turkeys and the like with detachable, metal bails attach to the roaster tray for removal of the bird from the oven and to the platter.

U.S. Pat. No. 4,092,909, issued in the name of Phillips, discloses a perforated self-draining meatloaf baking pan. These perforations allow grease to drain from the pan, away from the meatloaf, and into a catching pan, during baking.

Of considerable relevance is U.S. Pat. No. 4,677,906, issued in the name of Lowe. The '906 device discloses a pan insert used for removing and draining food from within a cooking receptacle. The insert has a flat tray which holds a roast or the like, and three side panels which hold the food on the tray and allow for sliding the roast or the like off the tray.

There is a problem associated with use of the '906 device. Use of the '906 device requires the user to slide the roast or like object off the tray and onto a plate before cutting the meat. This is disadvantageous for several reasons. First, while lifting of the meat is no longer necessary to remove it from a pan, the meat must still be scraped from the sides of the insert before being slid onto a plate, causing aesthetic damage. Second, the meat cannot be cut while on the insert. The stationary, vertical, side walls of the tray prohibit cutting of the meat into portions along the elongated portion of the meat, as is traditional. Third, a plate must be used with the insert for serving purposes, as the insert itself cannot act as a tray. Fourth, it is difficult to grab the insert to remove it from the traditional underlying catch basin.

While the pan insert feature of the '906 device is incorporated into this invention in combination, other elements are different enough as to make the combination distinguished over the inventors' own prior art.

A search of the prior art did not disclose any patents that read directly on the claims of the instant invention. Consequently, a need has been felt for providing an apparatus and method which overcomes the problems cited above.

SUMMARY OF THE INVENTION

It is therefore an object of the present invention to provide an improved meatloaf pan with removable, hinged, pan insert that facilitates the drainage of grease away from a meat product, such as meatloaf, or a bread product, during baking in a conventional oven, and which makes it easier to grasp and remove the pan insert from the meatloaf pan.

Briefly described according to one embodiment of the present invention, a meatloaf pan with removable, hinged pan insert is disclosed, comprising an elongated, rectangular meatloaf pan and an elongated, rectangular pan insert. The pan insert has two insert side panels that are hinged at their bottom edges to the longitudinal edges of the bottom of the pan insert. The hinges allow the insert side walls to support the meatloaf, bread or other product during baking, and fold downward to allow access to the product for cutting and serving purposes. As such, the present invention can be used as a serving tray. Removal of the pan insert is facilitated in one of three ways. First, built-in hand grips in the flanges located on the pan insert. Second, a set of handles that connect to the flanges located on the pan insert. Third, a sliding unit that slidably inserts into the cavity formed by the rolled edges of the flanges on the pan insert.

It is another object of the present invention to provide an improved meatloaf pan with removable, hinged, pan insert that facilitates the removal of a meat product, such as meatloaf, or a bread product, from the pan it is baked in, without aesthetic damage to the meat or bread.

It is another object of the present invention to provide hinged side walls that can be folded down to provide access to the meat or bread. This feature creates several benefits. First, the present invention facilitates the easy cutting of a meat product, such as meatloaf, or a bread product, from the pan insert itself. Second, the hinged side walls allow one to serve the meat product, such as meatloaf, or a bread product, from the pan insert itself, and as such, eliminating the necessity of a separate serving tray.

It is another object of the present invention to provide for removable handles that will facilitate the grasping and subsequent removal of the pan insert from the meatloaf pan.

DESCRIPTIVE KEY

10 meatloaf pan with removable, hinged, pan insert
20 meatloaf pan
40 top
50 bottom
55 pan flange
60 side wall
70 pan insert
80 insert bottom
100 insert side panel 110 hinging means
120 insert flange
130 hand grip
140 grease hole
150 non-stick material
160 insert stand
170 handle hole
180 handle
190 main body
200 coil spring protrusion
210 hooking means
220 sliding unit
230 central body
240 detente
250 handling means
260 lifting cavity

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of functional utility and description.

The best mode for carrying out the invention is presented in terms of its preferred embodiment, herein depicted within the FIGS. 1 through 7, and 10.

1. Detailed Description of the Figures

Figure 1:
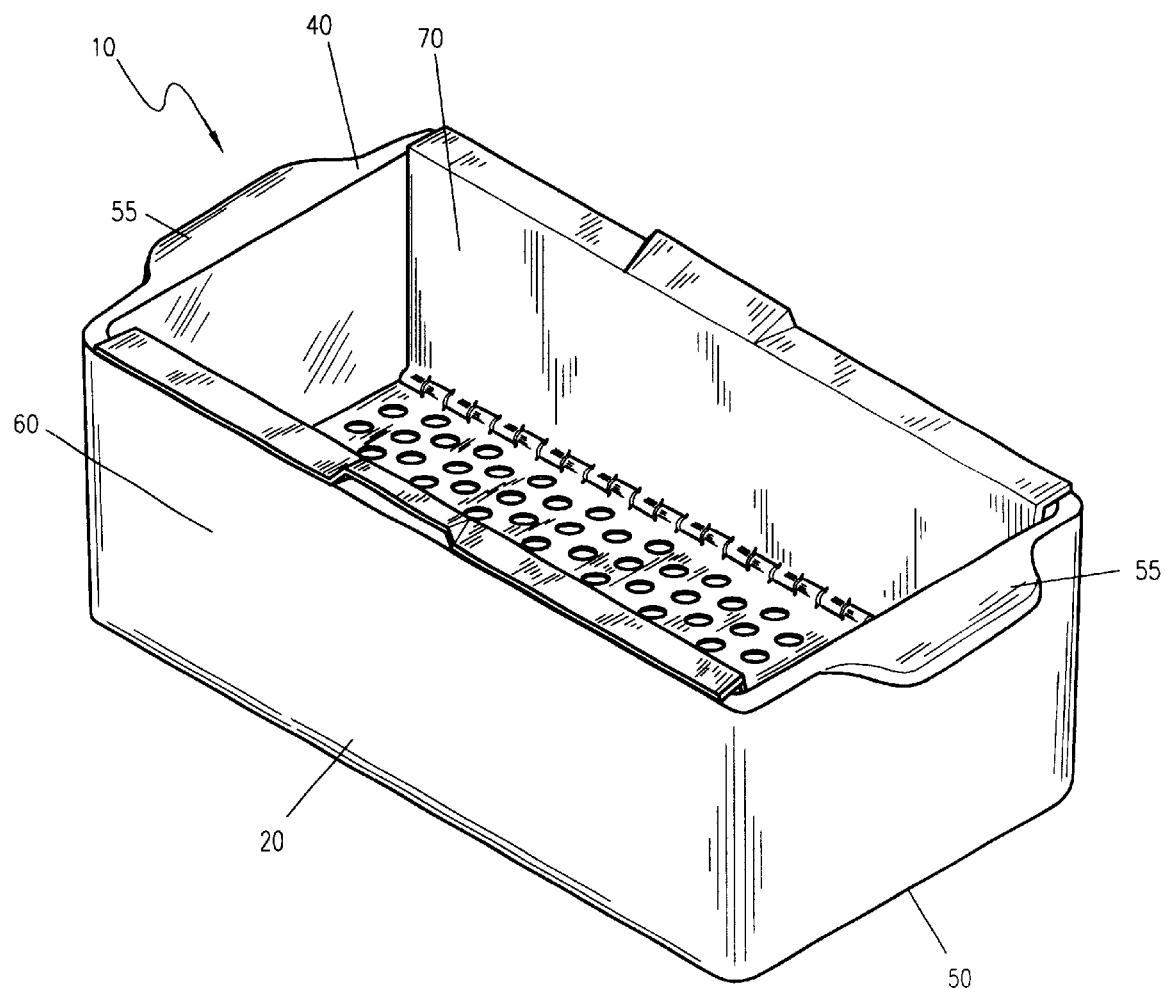
FIG. 1 is a elevational view of the preferred embodiment of a meatloaf pan with removable, hinged, pan insert 10.

Referring now to FIG. 1, a meatloaf pan with removable, hinged, pan 10 is shown, according to the present invention, comprises a longitudinally elongated, upstanding meatloaf pan 20 of generally rectangular configuration, designed to hold a meatloaf of traditional loaf configuration. The meatloaf pan 20 has an open top 40 and a closed bottom 50, and impervious side walls, attached to the bottom 50 along their common edges to form a receptacle for receiving a meatloaf, bread, or other product that requires baking. The meatloaf pan 20 is made of a strong, lightweight material, such as metal or ceramic. Pan flanges 55 protrude from the top edge of the side walls 60, extending outward, horizontally, serving as gripping means for the meatloaf pan 20.

Figure 2:
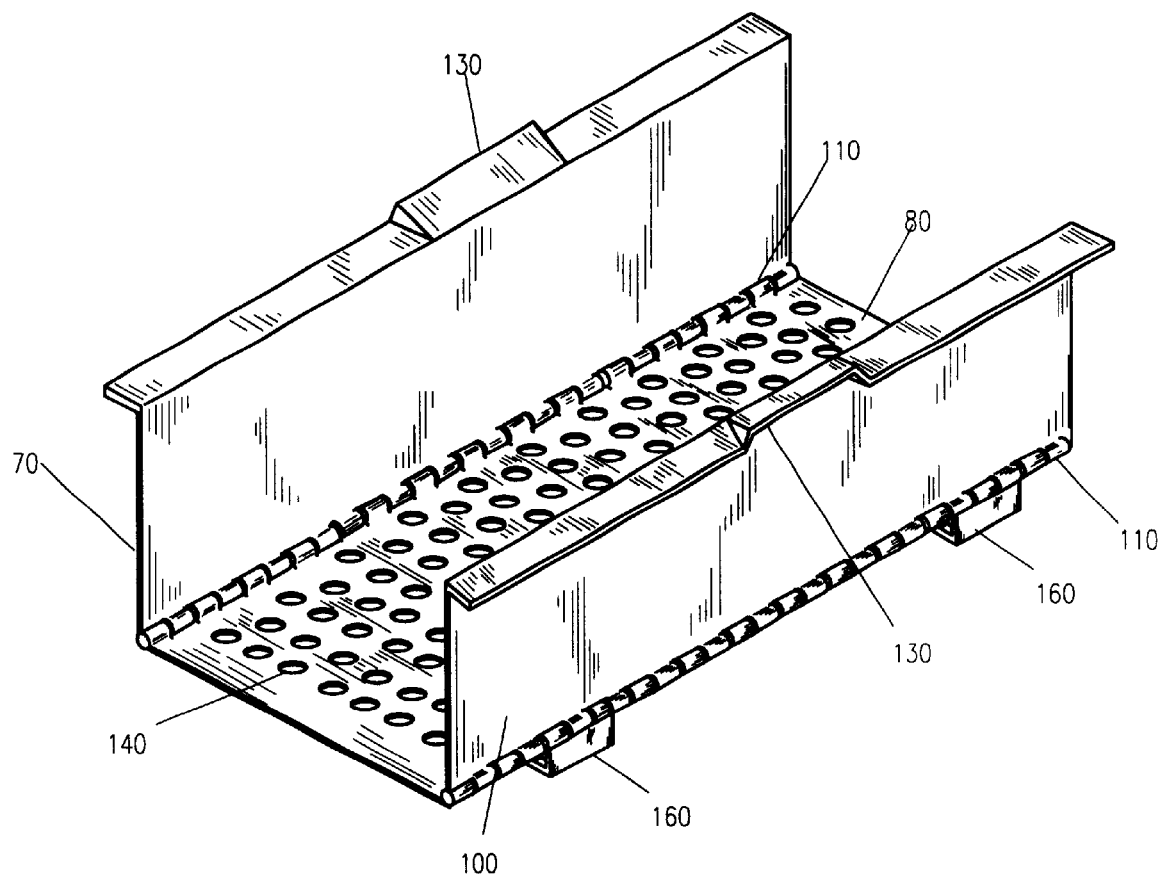
FIG. 2 is a perspective view of a pan insert.
Figure 3:
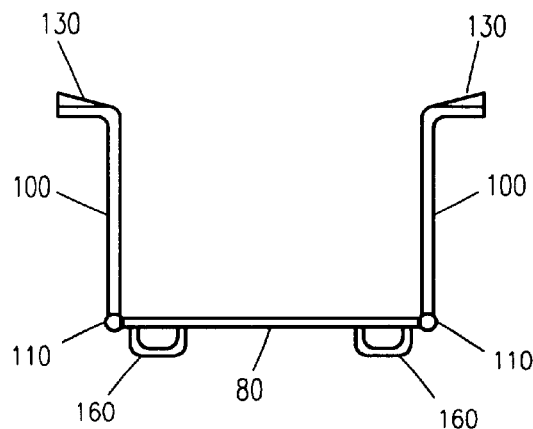
FIG. 3 is a front view thereof.

Referring now to FIGS. 2 & 3, a pan insert 70 is also disclosed, having a longitudinally elongated, relatively flat, insert bottom 80 of generally rectangular configuration, dimensioned to fit within the meatloaf pan 20. The pan insert 70 is designed to hold a meatloaf or other meat or bread, and to be inserted within the meatloaf pan 20. Once the food is cooked, the pan insert 70, as well as the food, may be removed from the meatloaf pan 20. The pan insert 70 is made from a strong, lightweight material, such as metal or ceramic.

The pan insert 70 has two longitudinally elongated, insert side panels 100, of generally rectangular configuration, designed to retain the food and also serve as carrying means. Each insert side panel 100 is connected entirely along one longitudinal edge to a longitudinal edge of the insert bottom 80 via a hinging means 110.

Figure 4:
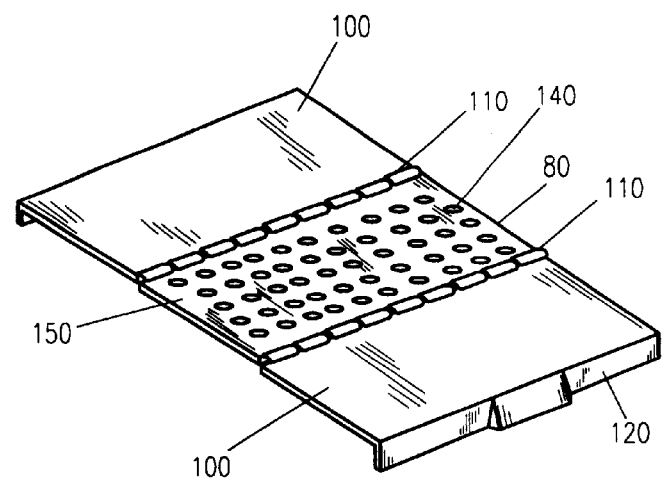
FIG. 4 is a perspective view thereof, in the open position.
Figure 5:
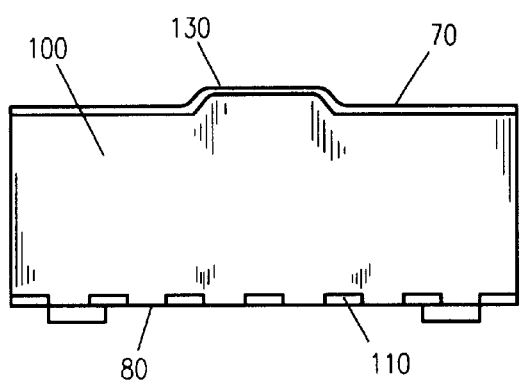
FIG. 5 is a side view of the pan insert.

Referring now to FIGS. 2, 3 & 4, the hinging means 110 is designed to allow each insert side panel 100 to pivot in the vertical plane along the corresponding longitudinal edge of the insert bottom 80, such that the insert side panels 100 can rest in the vertical plane during baking inside of the meatloaf pan 20, supporting the meatloaf (not shown), and can rest horizontally after removal of the pan insert 70 from the meatloaf pan 20, thus allowing the pan insert 70 to serve as a a cutting and serving tray.

Referring now to FIGS. 2, 3, 4, & 5, protruding outward from the top edge of each longitudinal insert side panel 100 is an insert flange 120. Each insert flange 120 extends longitudinally along the length of the insert side panel 100, extending outward at a right angle to the plane formed by the insert side panel 100. The longitudinal edge of each insert flange 120 is rounded.

The longitudinal midpoint each insert flange 120 contains a hand grip 130. Each hand grip 130 is formed from the insert flange 120, and consists of an upward deformation of the insert flange 120, with the insert flange 120 remaining horizontal in orientation. The vertical height of each hand grip 130 is sufficient to allow an individual to insert their fingers between the hand grip 130 and the pan flanges 55 when the pan insert 70 is in position inside the meatloaf pan 20.

The vertical height of the insert side panels 100 is such that when the pan insert 70 is placed inside the meatloaf pan 20, the insert bottom 80 does not come into contact with the bottom 50 of the meatloaf pan 20.

Figure 6:
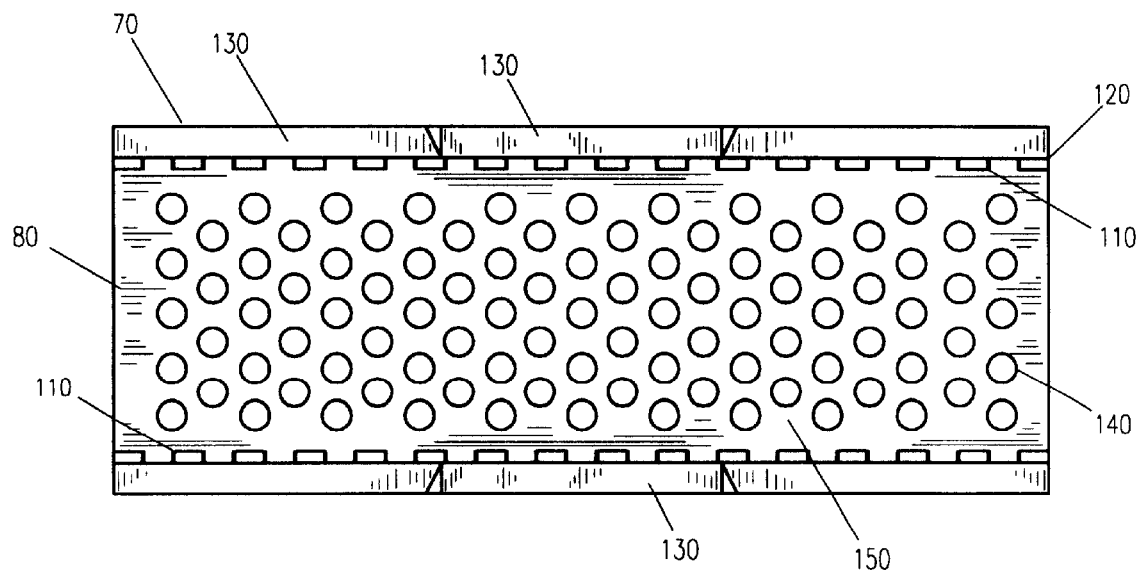
FIG. 6 is a top view thereof.

Referring now to FIGS. 2, 4 & 6, a plurality of grease holes 140 are positioned along the upper surface area of the insert bottom 80. The grease holes 140 are designed to facilitate the runoff of grease from the insert bottom 80 and into the bottom 50 of the meatloaf pan 20 during baking. A non-stick material, 150 such as Teflon, is placed on all surfaces of the pan insert 70 and the meatloaf pan 20.

Figure 7:
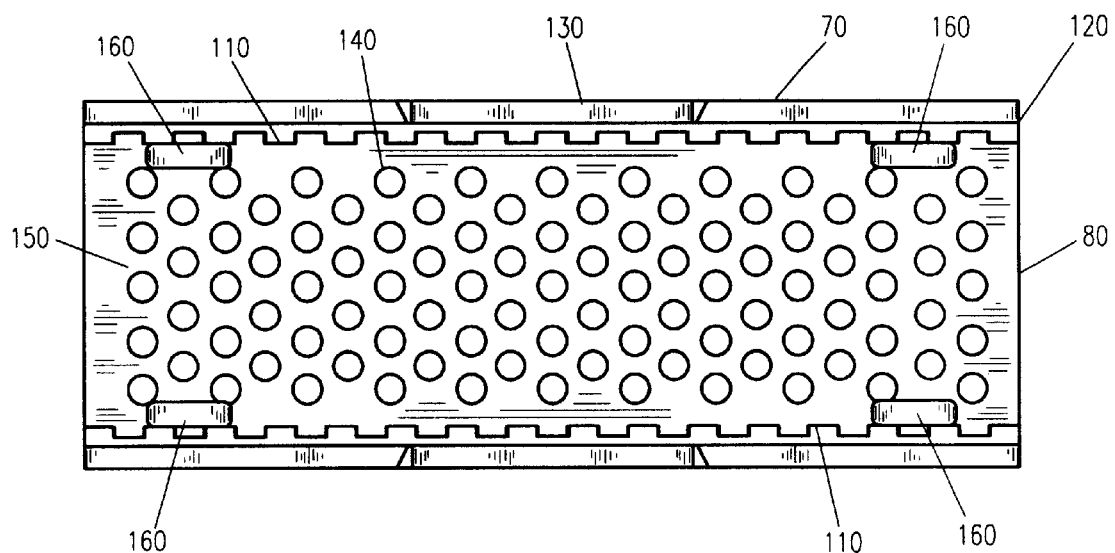
FIG. 7 is a bottom view thereof.

Referring now to FIG. 7, an insert stand 160 is connected to the lower surface of the insert bottom 80, near the corners of the insert bottom 80. Each insert stand 160 is cylindrical in configuration, extending vertically downward from the lower surface of the insert bottom 80. The insert stands 160 are designed to maintain a clearance between the insert bottom 80 and any surface the insert bottom 80 is placed on upon removal from the meatloaf pan 20.

It is envisioned that other styles and configurations of the meatloaf pan 20 and pan insert 70 can be easily incorporated into the teachings of the present invention, and only one particular configuration shall be shown and described for purposes of clarity and disclosure and not by way of limitation of scope.

Figure 8:
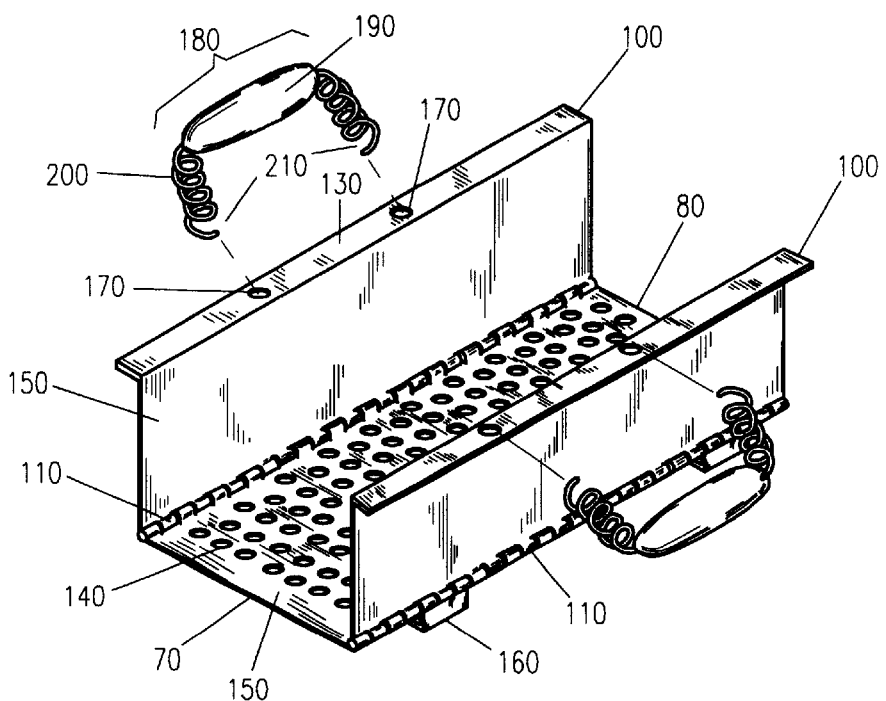
FIG. 8 is an exploded view of a preferred embodiment of the present invention.

Referring now to FIG. 8, in an alternate embodiment of the present invention, two handle holes 170 are located along the longitudinal centerline of the insert flange 120, equidistant from the midpoint of the insert flange 120. Two handles 180 are provided to assist with the removal of the pan insert 70 from the meatloaf pan 20. Each handle 180 consists of a main body 190, of an elongated, linear, cylindrical configuration, made from a non-heat conducting material, such as plastic or ceramic. Attached to each end of the main body 190 is a coil spring protrusion 200 of a spiral coil configuration, designed to dissipate heat during removal of the pan insert 70. The coil spring protrusions 200 extend perpendicular from the centerline of the main body 190, in the same plane, so as to form a handle 180 of generally U-shaped configuration. Each coil spring protrusion 200, opposite the main body 190, terminates in a hooking means 210. The linear distance between the hooking means 210 is such that hooking means 210 can be releasable inserted into the handle holes 170 on the insert flanges 120, to act as a handle 180.

Figure 9:
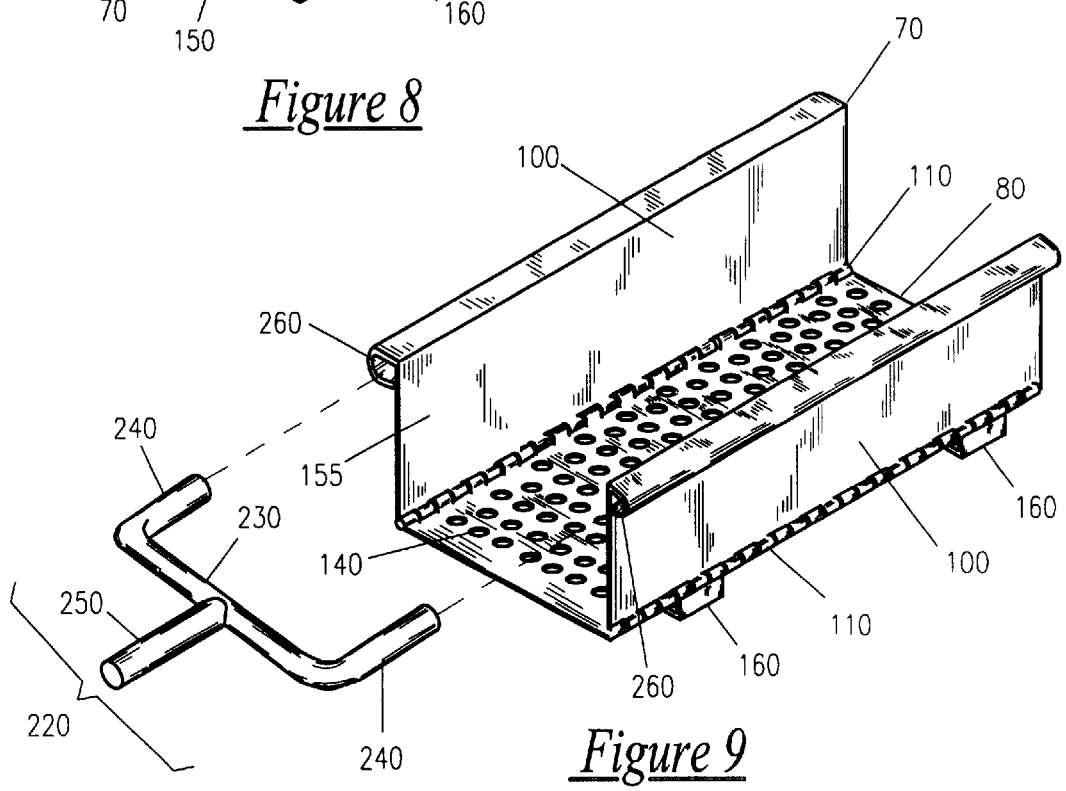
FIG. 9 is an exploded view of another alternate embodiment of the present invention.

Referring now to FIG. 9, in another alternate embodiment, a sliding unit 220 is provided to assist in removal of the pan insert 70. The sliding unit 220 consists of a cylindrical, elongated, linear, central body 230 with two detents 240 extending outward from the ends of the central body 230, parallel to each other, at a linear distance from each other slightly larger than the width of the exterior surface of the pan insert 70. Attached to the elongated, linear midpoint of the central body 230, and extending perpendicular from the central body 230, away from the detents 240, in the same plane as the detents 240, is a handling means 250. The handling means 250 is constructed of a heat resistant material with sufficient width to allow a person to control the rotational movement of the pan insert 70 about the handling means 250. The sliding unit 220 can take on numerous configurations, and the embodiment described herein is in no way meant as a limitation of the scope of the configuration.

The exterior edge of each insert flange 120 is rolled downward and inward, so as to form an elongated cylindrical lifting cavity 260, into which the detents 240 of the lifting device can be inserted.

2. Operation of the Preferred Embodiment

Figure 10:
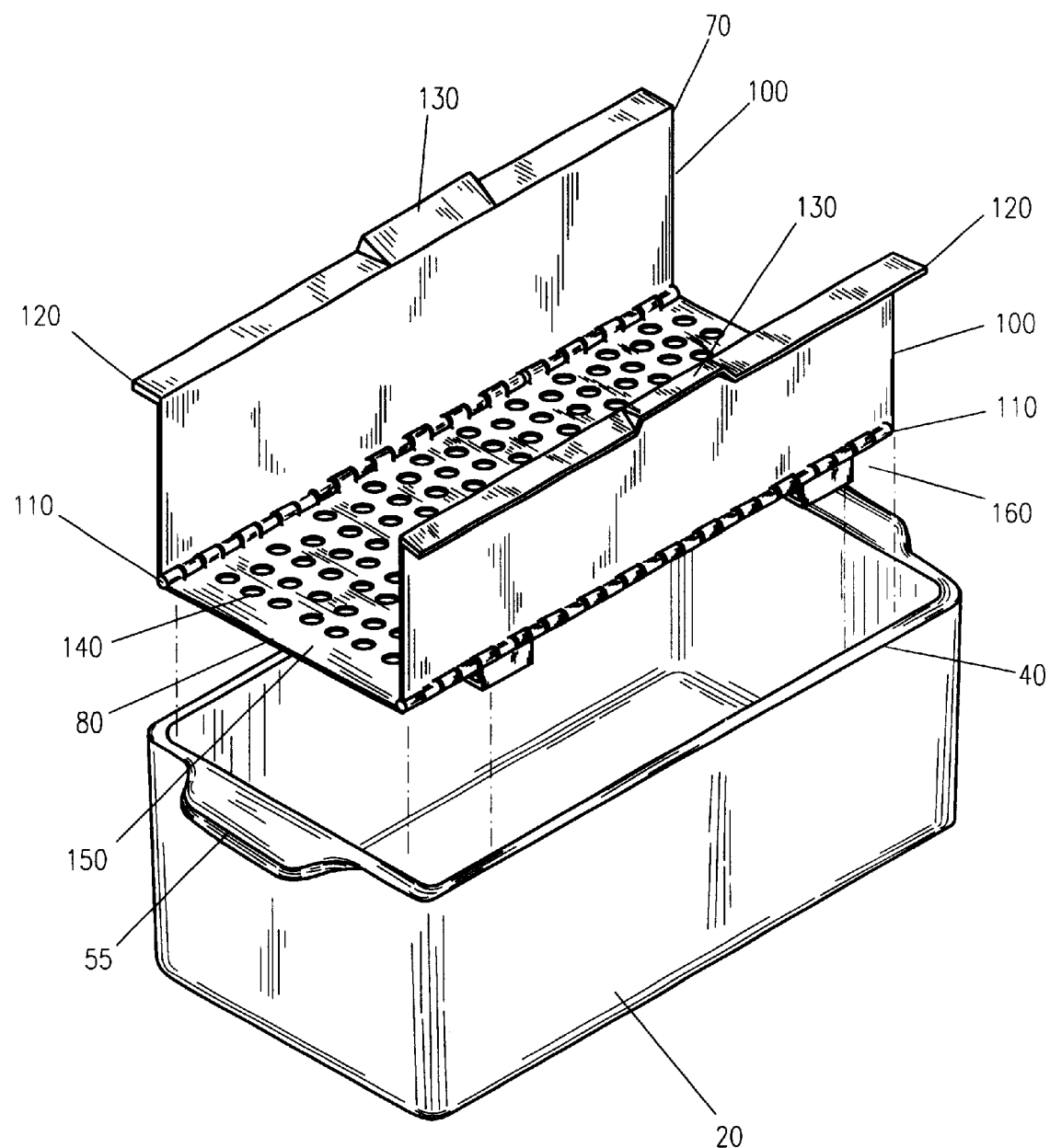
FIG. 10 is an exploded view of the preferred embodiment of the present invention.

Referring now to FIG. 10, to use the present invention: first, the operator places a meatloaf or bread into the pan insert 70; second, the operator places the pan insert 70 into the meatloaf pan 20 and places both into the oven; third, once the meat or bread is cooked, the operator removes the assembly from the oven; fourth, the operator then removes the pan insert 70 from the meatloaf pan 20 and places the pan insert 70 on a table. In the preferred embodiment, the operator grasps the hand grips 130 with his or her fingers and lifts the pan insert 70 out from the meatloaf pan 20. Referring now to FIG. 8, in the alternate embodiment with the handles 180, the operator grabs the handle 180 and hooks the ends of the coil spring protrusions 200 into the handle holes 170 on the insert flange 120, lifting the pan insert 70 from the meatloaf pan 20. Referring now to FIG. 9, in the alternate embodiment with the sliding unit 220, the operator slides the detents 240 of the sliding unit 220 into the lifting cavity 260 formed by the rolled insert flanges 120, and lifts the pan insert 70 from the meatloaf pan 20. F Fifth, the operator folds the insert side panels 100 downward and outward, providing access to the meatloaf for cutting and serving from the pan insert 70.

The foregoing description is included to illustrate the operation of the preferred embodiment and is not meant to limit the scope of the invention. The scope of the invention is to be limited only by the following claims.

What is claimed is:

1. A meatloaf pan with removable, hinged, pan insert comprising:

a longitudinally elongated, upstanding meatloaf pan of generally rectangular configuration, said meatloaf tray-being designed to hold a meatloaf of traditional loaf configuration, with side walls, a bottom and top, and pan flanges, which protrude from the top edge of the side walls, extending outward, horizontally, serving as gripping means for the meatloaf pan; and a pan insert of generally rectangular construction, said pan insert designed to be placed inside of said meatloaf pan during cooking, wherein said pan insert is further comprised of a longitudinally elongated, relatively flat, insert bottom of generally rectangular configuration, dimensioned to fit within said meatloaf pan, having longitudinal edges and an upper surface and a lower surface;

two longitudinally elongated insert side panels, of generally rectangular configuration, having a top edge, said side panels designed to retain the food and also serve as handles, connected entirely along one longitudinal edge to a longitudinal edge of said insert bottom;

hinging means, said hinging means connecting one longitudinal edge of each insert side panel to a longitudinal edge of said pan insert, and extending the entire longitudinal length of said pan insert;

insert flanges, said insert flanges protruding outward from the top edge of each longitudinal insert side panel, and extending longitudinally along the length of said insert side panels, extending outward at a right angle to the plane formed by said insert side panels, with a rounded longitudinal edge;

a plurality of grease holes positioned along the upper surface area of said insert bottom, said grease holes designed to facilitate the runoff of grease from said insert bottom and into the bottom of said meatloaf pan during baking; and insert stands of cylindrical configuration, extending vertically downward from said lower surface of said insert bottom, near the corners of said insert bottom, said insert stands being designed to maintain a clearance between said insert bottom and any surface said insert bottom is placed on upon removal from said meatloaf pan.

2. The meatloaf pan with removable, hinged pan insert described in claim 1, wherein said hinging means is designed to allow each insert side panel to pivot in the vertical plane along the corresponding longitudinal edge of said insert bottom, such that said insert side panels can rest in the vertical plane during baking inside of said meatloaf pan, supporting the meatloaf, and can rest horizontally after removal of said pan insert from said meatloaf pan, thus allowing said pan insert to serve as a cutting and serving tray.

3. The meatloaf pan with removable, hinged pan insert described in claim 1, wherein said insert flange further comprises a hand grip located at the longitudinal midpoint each insert flange contains a hand grip, each said hand grip formed from said insert flange, and consists of an upward deformation of said insert flange, with said insert flange remaining horizontal in orientation.

4. The meatloaf pan with removable, hinged pan insert as described in claim 3, wherein, the vertical height of each hand grip is sufficient to allow an individual to insert their fingers between said hand grip and said pan flanges when said pan insert is in position inside said meatloaf pan.

5. The meatloaf pan with removable, hinged, pan insert described in claim 1, wherein a non-stick material is placed on all surfaces of said pan insert and said meatloaf pan.

6. The meatloaf pan with removable, hinged pan insert described in claim 1, wherein said pan insert is further comprises of:

two handle holes located along the longitudinal centerline of said insert flange, equidistant from the midpoint of said insert flange said handles used to assist with the removal of said pan insert from said meatloaf pan.

7. The meatloaf pan with removable, hinged pan insert of claim 6, wherein a handle is disclosed, each said handle further comprising:

a main body, of an elongated, linear, cylindrical configuration, having two ends, and made from a non-heat conducting material, such as plastic or ceramic;

two coil spring protrusions, of spiral coil configuration, said coil spring protrusions attached to each end of said main body, extending perpendicular from the centerline of said main body, in the same plane, so as to form a handle of generally U-shaped configuration, and designed to dissipate heat during removal of said pan insert; and hooking means, said hooking means located at the end of said coil spring protrusions, opposite said main body, with the linear distance between the hooking means being such that hooking means can be releasable inserted into the handle holes on said insert flanges, to act as a handle.

8. The meatloaf pan with removable, hinged pan insert described in claim 1, wherein a sliding unit is provided to assist in removal of said pan insert, said sliding unit comprised of:

a cylindrical, elongated, linear, central body, having two ends;

two detents extending outward from the ends of said central body, parallel to each other, at a linear distance from each other slightly larger than the width of said exterior surface of said pan insert; and handling means, said handling means being attached to the elongated, linear midpoint of said central body, and extending perpendicular from said central body, away from said detents, in the same plane as said detents, said handling means being constructed of a heat resistant material with sufficient width to allow a person to control the rotational movement of said pan insert about said handling means.

9. The meatloaf pan with removable, hinged pan insert of claim 8, wherein said pan insert contains two lifting cavities, said lifting cavities formed from said insert flanges by rolling the exterior edge of each insert flange is rolled downward and inward, so as to form an elongated cylindrical cavity, into which said detents of said lifting device can be inserted.

10. The meatloaf pan and removable, hinged, pan insert described in claim 1, wherein to use said meatloaf pan and removable, hinged, pan insert:

first, the operator places a meatloaf or bread into said pan insert;

second, the operator places said pan insert into said meatloaf pan and places both into the oven;

third, once the meat or bread is cooked, the operator removes the assembly from the oven;

fourth, the operator then removes said pan insert from said meatloaf pan and places said pan insert on a table by grasping said hand grips with his or her fingers and lifting said pan insert out from said meatloaf pan; and fifth, the operator folds said insert side panels downward and outward, providing access to the meatloaf for cutting and serving from said pan insert.

\* \* \* \* \*